United States Patent

[11] 3,630,700

[72] Inventor Joseph J. Hammel
  Pittsburgh, Pa.
[21] Appl. No. 822,297
[22] Filed May 6, 1969
[45] Patented Dec. 28, 1971
[73] Assignee PPG Industries, Inc.
  Pittsburgh, Pa.

[54] PROCESS FOR FORMING PARTICLES OF MICROPOROUS GLASS FOR TOBACCO SMOKE FILTERS
  7 Claims, No Drawings

[52] U.S. Cl................................................. 65/21,
  65/22, 65/31, 65/33
[51] Int. Cl........................................C03b21/00,
  C03c 15/00
[50] Field of Search............................................ 65/22, 31,
  33, 348, 21

[56] References Cited
  UNITED STATES PATENTS
  2,500,801 3/1950 Church......................... 65/31 X 2,834,738 5/1958 Vincent......................... 65/31 X
  3,407,053 10/1968 Schulz........................... 65/21

*Primary Examiner*—Arthur D. Kellogg
*Attorney*—Chisholm and Spencer

ABSTRACT: This invention relates to a process for forming small particles of microporous glass having interconnected pores suitable to filter tobacco smoke. It particularly relates to a method of melting a phase-separable, metal borosilicate glass composition, quenching the melted glass by contacting the molten glass with a quenching fluid to reduce rapidly the temperature below the strain point of the glass, thereby fracturing the glass into small fragments, phase separating the fragmented glass by treatment at elevated temperatures below the miscibility temperature of the glass for a sufficient period to form a silica-rich phase and a substantially continuous borate-rich phase, then cooling the phase-separated glass, and thereafter leaching the glass to remove a sufficient quantity of the borate-rich phase to form microporous particles having interconnected pores.

PROCESS FOR FORMING PARTICLES OF MICROPOROUS GLASS FOR TOBACCO SMOKE FILTERS

BACKGROUND OF THE INVENTION

This application describes a process for forming tobacco smoke filters of the type claimed in copending application Ser. No. 822,213, filed May 6, 1969.

Patent application Ser. No. 736,670 describes a method of forming small particles of microporous glass wherein a metal borosilicate composition is melted, formed in sheets, phase separated while in sheet form, and subsequently leached to form a sheet of glass having interconnecting micropores. To form particles of suitable size for use in tobacco smoke filters, the microporous glass sheets were crushed and sized. This method produced microporous glass particles suitable for use as tobacco smoke filters but was disadvantageous in that very long periods of time were consumed by leaching glass in sheet form.

INVENTION

It has now been discovered that microporous glass particles having interconnecting pores useful as tobacco smoke filters can be advantageously formed by:
  a. melting a phase-separable metal borosilicate glass composition,
  b. quenching the glass by contacting the molten glass with a quenching fluid, for example, a bath of water, to reduce rapidly the temperature below the strain point of the glass thereby fracturing the glass into small fragments,
  c. phase separating the fragmented glass by treatment at elevated temperatures, generally between about 450° C. and about 750° C., and preferably between about 550° C. and 680° C., for a sufficient period of time to form a silica-rich phase and a substantially continuous borate-rich phase,
  d. cooling the phase-separated glass, and
  e. leaching the glass, preferably with an inorganic acid, to remove a sufficient quantity of the borate-rich phase to form microporous particles having interconnected pores.

In U.S. Pat. No. 2,106,744, the leaching of porous glass sheets was conducted in an acid bath at a temperature of approximately 98° C. for at least 1 day for each millimeter of glass thickness. In the instant invention, it has been found that the leaching of the glass may be conducted by treatment with an acid at temperatures between 70° C. and 200° C. in about 2 hours or less. Leaching is accomplished by use of an inorganic acid in concentrated form. Dilute acids may also be used with an accompanied increase in leaching time. Preferred acids are hydrochloric acid, sulfuric acid, and nitric acid, with a normality of about 1 to about 6.

Typical compositions useful in the process of the instant invention include metal borosilicates having generally less than about 20 percent metal oxide, about 60 to 90 percent silica, and about 30 to 50 percent boric acid. Such glasses may be formed from alkali metals such as sodium, potassium, or lithium; from alkaline earth metals such as calcium, strontium, barium, and the like; and from other metals such as lead, germanium, zinc, titanium, and the like. Preferred compositions comprise about 5 to 10 percent by weight of alkali metal oxide, preferably soda or potassia, about 15 to 30 percent by weight boric oxide, and about 70 to 80 percent by weight silica.

Other glass-forming ingredients, fluxes, fining agents, and the like may be included in glasses treated according to the instant invention; however, such additions should be made only in quantities which do not adversely affect phase separation or leaching. Generally, minor quantities of alumina and $P_2O_5$ may be present without introducing an adverse result. Also, typical fining agents such as $Sb_2O_3$, NaCl, and the like may be included, if desired, without altering the characteristics of the glass.

The borosilicate glasses useful in this invention may be melted by heating to temperatures in a range of about 1,204.4° C. to about 1,482.2° C. The glass may then be quenched to fragment the glass into small particles suitable for use in tobacco smoke filters. Liquids are preferred for quenching, especially water, although oils may be utilized, e.g., silicone oils and the like. The particles formed by quenching may vary in size depending upon the severity of the quench. Quenching of the molten glass, that is, glass at a temperature in the range of about 1,204.4° C. to about 1,482.2° C., into a large quantity of a liquid such as water at approximately room temperature produces fragmented glass having a particle size range of about 0.1 millimeter to about 1 centimeter, with an average size of about 1 to 2 millimeters. Quenching of the glass to produce small particles eliminates or at least substantially reduces the amount of crushing and sizing required to produce particles of the size desirable for use in tobacco smoke filters. The temperature of the quenching liquid may vary from room temperature (about 21.11° C.) or below to 204.44° C. or above; for example, where oils are utilized. However, it is generally advantageous to use lower temperatures, i.e., less than 37.22° C., especially with water.

The quantity of liquid required to frit the glass depends partly on the temperature of the molten glass and the temperature of the liquid. Sufficient liquid should be utilized to prevent rapid vaporization of the quenching liquid. Generally, the quantity of liquid, e.g., water, should be present as at least about 25 percent by weight of the glass to be quenched.

The particle size preferred for tobacco smoke filters is from about 1 micron to about 1,000 microns in diameter; i.e., 0.001 millimeter to about 1 millimeter, with an average size of about 0.1 to about 0.3 millimeter being preferred.

The glass is generally dried after quenching and then phase separated by heating to elevated temperatures; that is, temperatures in the range of about 450° C. to about 750° C. or higher, preferably from about 550° C. to about 680° C., for a period of several hours. Heat treating at higher temperatures for longer periods of time tends to agglomerate the borate-rich phase and, upon leaching, provides a structure having larger pores than articles treated at lower temperatures for shorter periods of time. In any event, the heat treatment is carried out below the miscibility temperature of the glass which may be readily determined.

The heat-treated glass is cooled, sized, if necessary, and then leached in an acid which dissolves the borate-rich phase, for example, hydrochloric acid, sulfuric acid, nitric acid, or combinations thereof, at temperatures above room temperature for a period sufficient to remove substantially all the borate-rich phase.

The resulting microporous particles having interconnecting pores of a diameter of about 40 angstroms to about 1,000 angstroms are thoroughly washed to remove trapped acids and residue. The composition of the microporous glass is very high in silica, that is, containing about 90 percent or more $SiO_2$, less than about 2 percent metal oxide, and less than about 10 percent boric oxide.

The following example illustrates a phase-separable borosilicate glass which was melted, quenched, heat treated, and leached to form a microporous glass useful in tobacco smoke filters and numerous other uses.

EXAMPLE I

A porous glass material was prepared by melting 8 pounds of a glass having the following calculated composition:

| | |
|---|---|
| $Na_2O$ | 5 percent by weight |
| $B_2O_3$ | 20 percent by weight |
| $SiO_2$ | 75 percent by weight |

The glass was melted at 1,450° C. and poured into a 5 liter container of water at room temperature. The rapid quenching of the glass caused fritting of the glass, i.e., formation of small fragments of about 0.1 millimeter to about 1 centimeter in size. These fragments were then crushed and sieved to obtain grain sizes of between 0.3 and 0.7 millimeter in size. The glasses were divided into several portions which were heat treated for various periods of time to provide variations in phase separation.

All the following glasses were leached in three normal hydrochloric acid for 8 hours at 98° C. and washed thoroughly. The pore size of the various glasses was determined by measuring the leached areas on an electron micrograph. This measurement has an accuracy of about ±25 percent although the measurement gets more accurate as the pores get larger.

Glass 1a

This glass was heat treated for 1 hour at 630° C. The pore size was determined to be about 100 angstroms on the average.

Glass 1cd

This material was heat treated for 3½ hours at 630° C. The pore size had an average diameter of 250 angstroms.

Glass 1e

This material was heat treated for 3 hours at 630° C. and had an average pore size of 250 angstroms.

Glass 1f

This glass was heat treated for 16 hours at 760° C. and had an average pore size of between about 750 and 1,000 angstroms.

Glass 1q

This glass was heat treated 3 hours at 675° C. and had an average pore size of about 500 angstroms.

The effectiveness of the above porous glasses having a range of pore sizes as cigarette or tobacco smoke filters was tested in the following manner:

Particulate Matter Filtration

The effectiveness of the above porous glasses as filters for particulate matter in tobacco smoke was tested by utilizing a Winston cigarette with a cellulose filter as received as a control. Test cigarettes were compared by utilizing a substituted filter of 20 millimeters length on the Winston cigarette with the following lengths of material: 5 millimeters of cellulose, 10 millimeters of porous glass, and 5 millimeters of cellulose. The size of the particulate matter removed ranged from 297 microns to 420 microns. Each cigarette was smoked until a butt length of 33 millimeters remained. The draw through the test filtered cigarette was the same as the standard Winston filter cigarette. Generally, an average of 10 puffs on a standard smoke machine was required to produce a 35 millimeter puff at 2 seconds or rationed at the rate of about 1 puff per minute.

| Sample | Average Filter Disc Weight Gain (MGS) |
| --- | --- |
| Winston cigarette control | 21.0 |
| Glass 1e | 22.6 |
| Glass 1f | 22.8 |
| Glass 1g | 21.1 |

The average filter disc weight gain is the particulate matter collected on a Cambridge filter which filters out the particulate matter which passes through the cigarette filter. It is readily seen that the above filters are about as effective as the cellulose filter in removing particulate matter. The Glass 1g filter having a pore size of about 500 angstroms appears slightly more effective than the porous filters having pore sizes of 250 angstroms or in the 750 to 1,000 angstrom range.

Gas Filter Effectiveness

The above porous glasses were tested for their effectiveness in removing acetaldehyde and acetone. The test was conducted in a similar manner to that for the particulate filtration test with a Winston cigarette with a cellulose filter being utilized as a standard or control. The actual quantity of gas is not reported but the peak height of the glass chromatograph analysis is indicated which is proportional to concentration.

| Sample | Acetaldehyde | Acetone |
| --- | --- | --- |
| Winston Cigarette with 20 mm. Standard Cellulose Filter | 46 | 14 |
| Winston Cigarette with 10 mm. Cellulose Filter and 10 mm. Glass 1a | 28 | 7 |
| Winston Cigarette with 10 mm. Cellulose and 10 mm. Porous Glass 1e | 21 | 6 |
| Winston Cigarette with 10 mm. Cellulose and 10 mm. Porous Glass 1g | 21 | 6 |
| Winston Cigarette with 10 mm. Cellulose and 10 mm. Porous Glass 1f | 35 | 8 |
| Winston Cigarette with no filter of any type | 51 | 18 |

From the above data it can be seen that the porous glass filters are considerably more effective in reducing the amount of harmful gases such as acetaldehyde and acetone passing through the filter than is the standard cellulose filter. The porous glasses having small pores (Glasses 1a, 1e, and 1g), that is, pores between about 100 and 500 angstroms, appear more effective in removing gases such as acetaldehyde and acetone than does glass having pores in the range of 750 and 1,000 angstroms (Glass 1f). However, even the material having larger pores is more effective in removing gases than a standard cellulose filter.

None of the porous glass materials described in this example had been treated with water vapor, i.e., the hydroxyl concentration on the surface of the glass had not been altered from that which naturally exists on such glasses after phase separation, leaching, and washing.

I claim:

1. A process for forming small particles of microporous glass between 0.1 millimeter to about 1 centimeter and having interconnecting pores comprising
   a. melting a phase-separable metal borosilicate glass composition,
   b. quenching the melted glass by contacting the molten glass with a quenching fluid in a manner to substantially instantaneously reduce the temperature below the strain point of the glass thereby fracturing the glass into small fragments between 0.1 millimeter to about 1 centimeter,
   c. phase separating the fragmented glass by treatment at elevated temperatures below the miscibility temperature of the glass for a sufficient period of time to form a silica-rich phase and a substantially continuous borate-rich phase,
   d. cooling the phase-separated glass, and
   e. leaching the glass to remove a sufficient quantity of the borate-rich phase to form microporous glass particles containing 90 percent or more $SiO_2$ and having interconnecting pores.

2. The method of claim 1 wherein the microporous glass has interconnecting pores of about 40 to 1,000 angstroms.

3. The method of claim 1 wherein the phase-separable glass is an alkali metal borosilicate glass composition.

4. The method of claim 3 wherein the alkali metal is sodium or potassium.

5. The method of claim 1 wherein the quenching fluid is a liquid.

6. The method of claim 5 wherein the quenching liquid is water.

7. The method of claim 6 wherein the water is present in sufficient quantity to preclude rapid vaporization thereof during quenching of the molten glass.

* * * * *